(12) United States Patent
Wu

(10) Patent No.: US 11,412,329 B1
(45) Date of Patent: Aug. 9, 2022

(54) HOME ENTERTAINMENT SYSTEM

(71) Applicant: Wudi Industrial (Shanghai) Co., Ltd., Shanghai (CN)

(72) Inventor: Peng Wu, Shanghai (CN)

(73) Assignee: WUDI INDUSTRIAL (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/347,830

(22) Filed: Jun. 15, 2021

(51) Int. Cl.
 *H04R 5/04* (2006.01)
 *G06F 3/16* (2006.01)

(52) U.S. Cl.
 CPC .............. *H04R 5/04* (2013.01); *G06F 3/165* (2013.01); *H04R 2420/07* (2013.01)

(58) Field of Classification Search
 None
 See application file for complete search history.

(56) References Cited

U.S. PATENT DOCUMENTS

| | | | | |
|---|---|---|---|---|
| 2005/0261789 A1* | 11/2005 | Chen | ........................ | H04W 4/18 700/94 |
| 2008/0137879 A1* | 6/2008 | Schwartz | .................. | H04S 7/40 381/77 |
| 2016/0066093 A1* | 3/2016 | Fisher | ..................... | G06F 3/165 381/80 |
| 2020/0314541 A1* | 10/2020 | Tracy | ..................... | H04R 1/025 |

* cited by examiner

*Primary Examiner* — Paul W Huber
(74) *Attorney, Agent, or Firm* — Bayramoglu Law Offices LLC

(57) ABSTRACT

The present invention relates to a home entertainment system, which includes four major parts: entertainment play equipment, a Bluetooth transmitter, a set of rear audio play devices, and a set of front audio play devices with a subwoofer.
The rear audio play devices are composed of a main speaker, a sub-speaker, wire, and a Bluetooth receiver; the front Bluetooth speakers are composed of a main speaker, a sub-speaker, a subwoofer, wire, and a Bluetooth receiver, and each Bluetooth receiver is integrated in each main speaker.
This home entertainment system uses a Bluetooth transmitter module to connect the entertainment play equipment with the rear speakers and the front speakers through wireless radio waves, and can simultaneously emit 4-channel audio of left front, left rear, right front, and right rear to achieve stereo surround sound effects. When the existing home entertainment audio is installed, it is necessary to drill, wire, and construct on the wall. That method is costly, and will destroy the original decoration and cause inconvenience. Therefore, we bring forward the home entertainment system.

1 Claim, 3 Drawing Sheets

HOME ENTERTAINMENT SYSTEM

TECHNICAL FIELD

The present invention relates to the technical field of audio entertainment, and particularly, to a home theater entertainment system.

BACKGROUND

As the Internet application technology becomes more and more mature, users have higher and higher demands for watching movies and singing at home. That is to say, the home entertainment system is becoming more and more widely used. Home entertainment system is to achieve the stereo surround sound effect by simultaneously outputting audio of different channels through multiple audio output devices.

However, when the existing home entertainment system is installed, it is necessary to drill, wire, and construct on the wall. That method is costly, and will destroy the original decoration and cause inconvenience. Therefore, we bring forward the home entertainment system.

SUMMARY

In order to overcome the shortcomings of the prior art, the present invention provides a home entertainment system. The home entertainment system connects the entertainment play equipment and two sets of audio play devices through wireless radio waves at the same time to achieve a 4-channel stereo surround sound effect. It is efficient and convenient to use, and does not require drilling, wiring, and construction on the wall. The cost is low, the original decoration is not damaged, and the safety is high.

In order to solve the above technical problems, the present invention provides the following technical solutions: The home entertainment system includes an entertainment play equipment, a Bluetooth transmitter, front speakers, and rear speakers. A section of the entertainment play equipment (100) is connected with a Bluetooth transmitter (110), and the Bluetooth transmitter (110) is simultaneously connected to the front speakers (130) and the rear speakers (120) through wireless radio waves.

As a preferred technical solution of the present invention, the right channel main speaker in the front audio play devices is provided with a control panel, and the control panel controls audio size, previous song, next song, stop, and play functions.

As a preferred technical solution of the present invention, two audio play devices are connected at the same time: 1. The rear audio play devices (120) include rear audio play device wire (1201), a rear left channel sub-speaker (1202) and a rear right channel main speaker (1203). The right channel main speaker (1203) has a built-in Bluetooth receiver module, and the rear right channel main speaker (1203) is wirelessly connected to the Bluetooth transmitter through the Bluetooth receiver module; 2. The front audio play devices (130) include front audio play device wire (1301), a front left channel sub-speaker (1302), front right channel main speaker (1303) and a subwoofer (1304). The Bluetooth transmitter (110) is connected to the front right channel main speaker (1303) through wireless radio waves.

As a preferred technical solution of the present invention, one end of the Bluetooth transmitter is provided with a USB interface, and the entertainment play equipment is connected to the Bluetooth transmitter through the USB interface.

Compared with the prior art, the beneficial effects that the present invention can achieve are:

This home entertainment system connects the entertainment play equipment and two audio play devices viwireless radio waves at the same time to achieve 4-channel stereo surround sound. It is efficient and convenient to use, and does not require drilling, wiring, and construction on the wall. The cost is low, the original decoration is not damaged, and the safety is high.

Among them: 100, entertainment play equipment; 110, Bluetooth transmitter; 120, rear audio play devices; 1201, rear audio play device wire; 1202, rear left channel sub-speaker; 1203, rear right channel main speaker; 130, front audio play devices; 1301, front audio play device wire; 1302, front left channel sub-speaker; 1303, front right channel main speaker; 1304, subwoofer.

DETAILED INVENTION

In order to make the technical means, creative features, objectives, and effects of the present invention easy to understand, the following will further illustrate the present invention with specific embodiments, but the following embodiments are only preferred embodiments of the present invention, not all of them. Based on the examples in the implementation manners, other examples obtained by those skilled in the art without creative work shall fall within the protection scope of the present invention. The experimental methods in the following examples are conventional methods unless otherwise specified. The materials and reagents used in the following examples can be obtained from commercial sources unless otherwise specified.

Example

Figure 1:
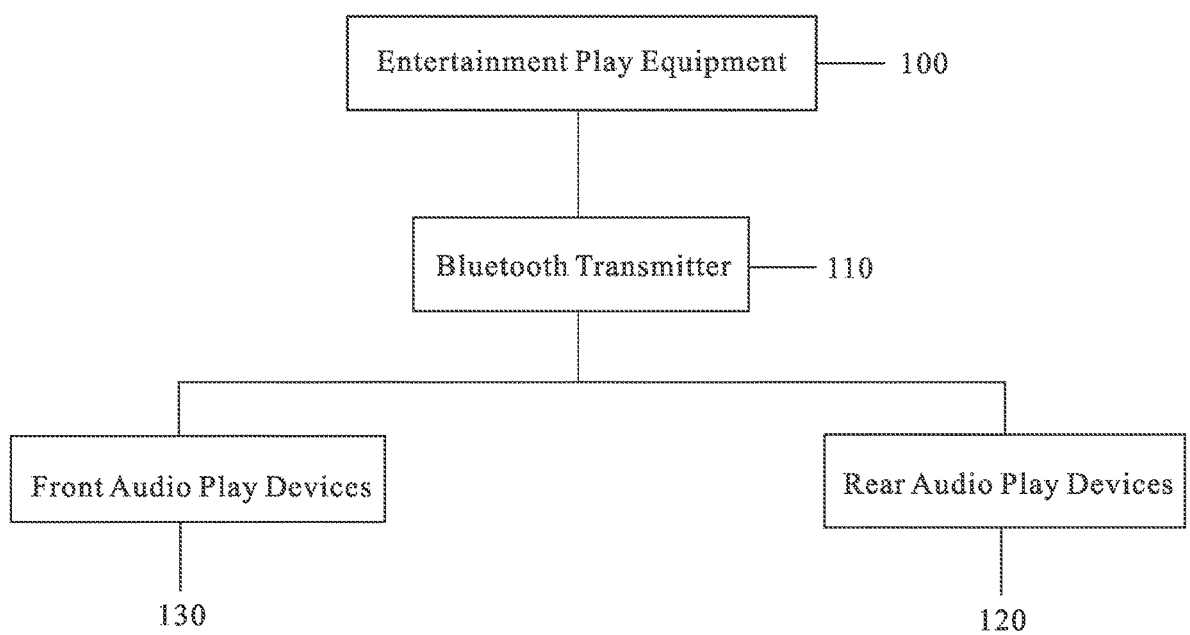
FIG. 1 is a schematic diagram of the system structure of the present invention.

As shown in FIG. 1, the home entertainment system includes an entertainment play equipment, a Bluetooth transmitter, front audio play devices, and rear audio play devices. A Bluetooth transmitter (110) is connected to one end of the entertainment play equipment (100), and the Bluetooth transmitter (110) is simultaneously connected to the front audio play devices (130) and the rear audio play devices (120) through wireless radio waves. And this home entertainment system uses a Bluetooth transmitter module (110) to connect the entertainment play equipment (100) with the rear speakers and the front speakers through wireless radio waves, and can simultaneously emit 4-channel audio with left front, left rear, right front, and right rear to achieve stereo surround sound effects. Existing home entertainment audio entertainment is to make holes in the wall, wiring, and construction to hang large audio equipment on the ceiling or wall. However, that method is costly and requires construction and involves The original decoration is destroyed, and there are potential safety hazards. For this reason, we propose a home entertainment system.

Figure 3:
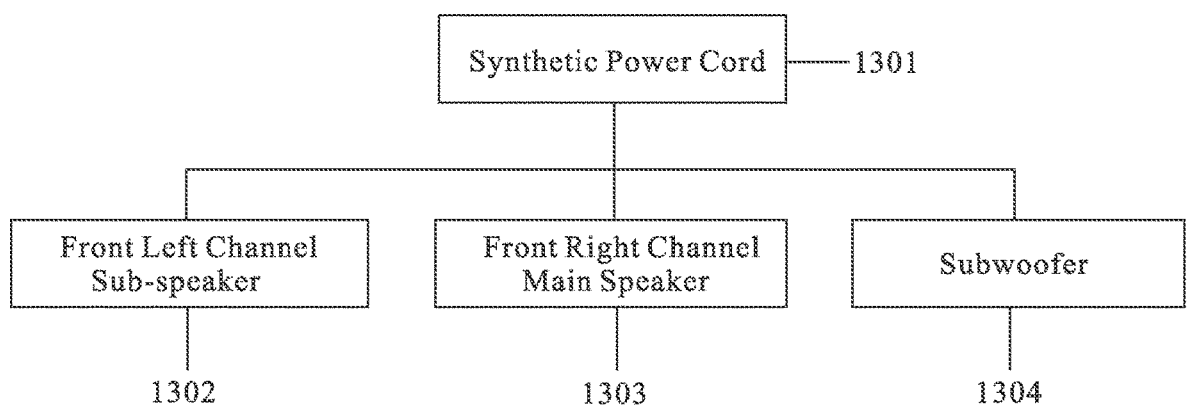
FIG. 3 is a schematic diagram of the front speakers of the present invention.

In other embodiments, this embodiment discloses, as shown in FIG. 3, as a preferred technical solution of the present invention, the right channel main speaker in the front audio play devices is provided with a control panel, and the control panel controls the size of the audio, previous song, next song, stop, and play functions.

Figure 2:
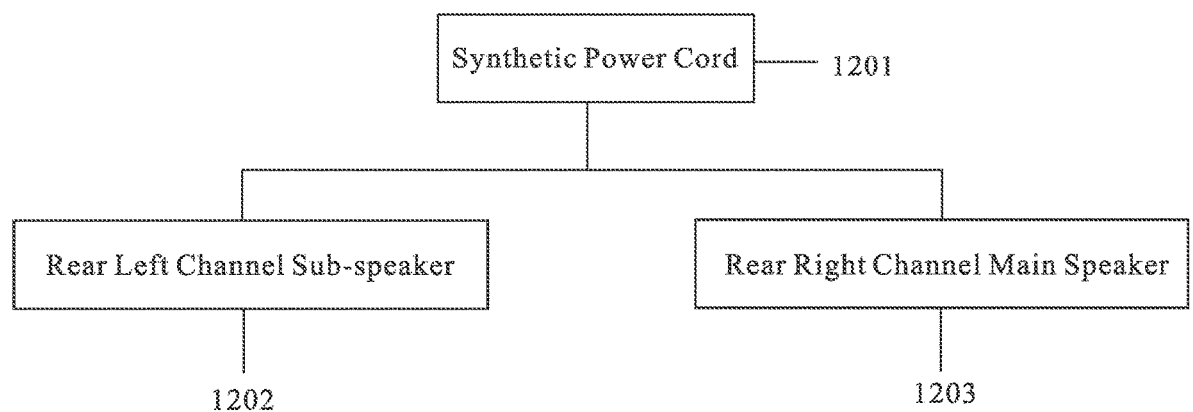
FIG. 2 is a schematic diagram of the rear speakers of the present invention.

In other embodiments, this embodiment discloses, as shown in FIGS. 1-3, the home entertainment system is characterized in that two audio play devices are connected at the same time: 1. The rear audio play devices include rear audio play device wire (1201), a rear left channel sub-speaker (1202), a rear right channel main speaker (1203), the rear right channel main speaker (1203) has a built-in Bluetooth receiver module, and the rear right channel main speaker (1203) is wirelessly connected to the Bluetooth transmitter through the Bluetooth receiver module; 2. The front audio play devices include front audio play device wire (1301), a front left channel sub-speaker (1302), a front right channel main speaker (1303) and a subwoofer (1304). The Bluetooth transmitter is connected to the front right channel main speaker (1303) through wireless radio waves.

In other embodiments, this embodiment discloses, as shown in FIG. 1, a USB interface is provided at one end of the Bluetooth transmitter (110), and the entertainment play equipment (100) is connected to the Bluetooth transmitter (110) through the USB interface, which can make the entertainment play equipment (100) have a multi-object Bluetooth transmission function.

In the present invention, unless otherwise clearly ruled and limited, the "on" or "under" of first feature of the second feature may include direct contact between the first and second features, or include it when the features are not in direct contact but through other features between them. Moreover, "above" the second feature of the first feature include the first feature being directly above and obliquely above the second feature, or it simply means that the level of the first feature is higher than that of the second feature. The "below" of the second feature of the first feature include the first feature directly below and obliquely below the second feature, or it simply means that the level of the first feature is lower than the second feature.

The above shows and describes the basic principles, main features and advantages of the present invention. Those skilled in the industry should understand that the present invention is not limited by the above-mentioned embodiments. The above-mentioned embodiments and the description are only preferred examples of the present invention, and are not used to limit the present invention. Under the premise of spirit and scope, the present invention will have various changes and improvements, and these changes and improvements fall within the scope of the claimed present invention. The scope of protection claimed by the present invention is defined by the appended claims and their equivalents.

The invention claimed is:

1. A home entertainment system, comprising:
   entertainment play equipment;
   a Bluetooth transmitter;
   front audio play devices; and
   rear audio play devices,
   wherein one end of the entertainment play equipment is connected with the Bluetooth transmitter, and the Bluetooth transmitter is simultaneously connected to the front audio play devices and the rear audio play devices through wireless radio waves,
   wherein the front audio play devices and the rear audio play devices are connected at the same time,
   wherein the rear audio play devices include a separate rear audio play device power cord, a rear left channel sub-speaker and a rear right channel main speaker, the separate rear audio play device power cord connects to the rear left channel sub-speaker and the rear right channel main speaker,
   wherein the rear right channel main speaker has a built-in Bluetooth receiver module, and the rear right channel main speaker is wirelessly connected to a Bluetooth transmitter through the Bluetooth receiver module;
   wherein the front audio play devices include a separate front audio play device power cord, a front left channel sub-speaker, a front right channel main speaker and a subwoofer, the separate front audio play device power cord connects to the front left channel sub-speaker, the front right channel main speaker, and the subwoofer,
   wherein the front right channel main speaker has a built-in Bluetooth receiver module, the Bluetooth transmitter is connected to the front right channel main speaker through wireless radio waves, and the front right channel main speaker is provided with a control panel,
   wherein the control panel controls audio volume, previous song, next song, stop, and play functions,
   wherein the Bluetooth transmitter is provided with a USB interface at one end, and the entertainment play equipment is connected to the Bluetooth transmitter through the USB interface.

\* \* \* \* \*